(12) United States Patent
Endo et al.

(10) Patent No.: US 9,738,307 B2
(45) Date of Patent: Aug. 22, 2017

(54) STEERING CONTROL DEVICE, AND STEERING CONTROL METHOD

(71) Applicant: Mitsubishi Electric Corporation, Tokyo (JP)

(72) Inventors: Masaya Endo, Tokyo (JP); Hidetoshi Ikeda, Tokyo (JP); Isao Kezobo, Tokyo (JP); Kenji Ogawa, Tokyo (JP); Taizo Toda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/767,374

(22) PCT Filed: Apr. 8, 2013

(86) PCT No.: PCT/JP2013/060636
§ 371 (c)(1),
(2) Date: Aug. 12, 2015

(87) PCT Pub. No.: WO2014/167631
PCT Pub. Date: Oct. 16, 2014

(65) Prior Publication Data
US 2016/0001814 A1    Jan. 7, 2016

(51) Int. Cl.
*B62D 5/00* (2006.01)
*B62D 5/04* (2006.01)
*B62D 6/08* (2006.01)

(52) U.S. Cl.
CPC ......... *B62D 5/0466* (2013.01); *B62D 5/0463* (2013.01); *B62D 6/08* (2013.01)

(58) Field of Classification Search
None
See application file for complete search history.

(56) References Cited

U.S. PATENT DOCUMENTS

| 6,082,482 A | 7/2000 | Kato et al. |
| 2010/0268421 A1 | 10/2010 | Yang et al. |

(Continued)

FOREIGN PATENT DOCUMENTS

| CN | 102372027 A | 3/2012 |
| JP | 10-278829 A | 10/1998 |

(Continued)

OTHER PUBLICATIONS

International Search Report of PCT/JP2013/060636 dated May 28, 2013.

(Continued)

*Primary Examiner* — Angela Ortiz
*Assistant Examiner* — Garrett Evans
(74) *Attorney, Agent, or Firm* — Sughrue Mion, PLLC; Richard C. Turner

(57) ABSTRACT

Provided are a steering control device and the like, including the steps of: calculating a steering assist torque to be applied to an actuator for applying the steering assist torque to a steering system of a vehicle in order to improve return characteristics of the steering system; determining a steering state of a driver; correcting the steering assist torque depending on a result of the steering state determination; and controlling the actuator depending on the corrected steering assist torque, in which the step of determining a steering state of a driver includes determining the steering state of the driver based on a combination of at least two of the following: a manually-operating steering state determination; an abrupt steering wheel return determination; a high-acceleration steering wheel return determination; a manual return steering determination; and an additional-steering determination.

15 Claims, 8 Drawing Sheets

(56) References Cited

U.S. PATENT DOCUMENTS

2012/0041645 A1 2/2012 Benyo et al.
2013/0226411 A1* 8/2013 Hirano .................. B62D 6/008
701/42

FOREIGN PATENT DOCUMENTS

| JP | H10 264842 A | 10/1998 |
| JP | 2001-219864 A | 8/2001 |
| JP | 2001-278084 A | 10/2001 |
| JP | 2002-120745 A | 4/2002 |
| JP | 2004074986 A | 3/2004 |
| JP | 2006-123827 A | 5/2006 |
| JP | 2009-262622 A | 11/2009 |

OTHER PUBLICATIONS

European Search Report; Application No. 13882012.1-1755/ 2985206 PCT/JP2013060636; Nov. 18, 2016.
Communication dated Feb. 28, 2017, from the State Intellectual Property Office of the P.R.C., in counterpart Chinese application No. 201380075413.X.

* cited by examiner

STEERING CONTROL DEVICE, AND STEERING CONTROL METHOD

CROSS REFERENCE TO RELATED APPLICATIONS

This is a National Stage of International Application No. PCT/JP2013/060636 filed Apr. 8, 2013, the contents of which are incorporated herein by reference in its entirety.

TECHNICAL FIELD

The present invention relates to a steering control device for assisting steering by a driver.

BACKGROUND ART

As related-art steering control devices, there are known steering control devices for generating a steering wheel return torque by a motor in order to improve steering wheel return characteristics at the time when a driver releases a steering wheel from his/her hand at low vehicle speed (for example, Patent Literatures 1 to 3).

In Patent Literature 1, polarity determination is performed to determine that a steering wheel is in a return state when a rotation direction of a motor and an input direction of a steering torque are different from each other, and whether or not to apply a return torque is selected. In order to prevent the occurrence of a phenomenon that a driver receives a force from the steering wheel in an unintended direction, namely, a so-called unintended steering of the steering wheel, which is caused even when the driver slightly returns the steering wheel in the steering-holding state (in the state in which the driver does not steer the steering wheel greatly during straight travel or the like), whether or not to apply the return torque is selected based on the magnitude of the steering torque.

In Patent Literature 2, the following configuration is proposed. A target steering angle for returning a steering wheel to a neutral position is set based on a steering angle and a vehicle speed, and an ideal target steering angular speed is set depending on a deviation between the target steering angle and the steering angle and on the vehicle speed. A target converging current is set based on a deviation between the target steering angular speed and a steering angular speed. Then, when a steering torque is near 0, it is determined that a driver is lightly touching the steering wheel with his/her hand or that the driver is releasing the steering wheel from his/her hand, and the target converging current is applied.

In Patent Literature 3, it is proposed to multiply a deviation between a target steering angular speed and a steering angular speed by a steering torque multiplication coefficient value, to thereby calculate a correction current value.

As described above, in the related-art steering control devices, in a region in which the steering torque is small, it is determined that the driver is lightly touching the steering wheel with his/her hand or that the driver is releasing the steering wheel from his/her hand, and the steering wheel return torque for improving the steering wheel return characteristics is applied. In contrast, in a region in which the steering torque is large, it is determined that the driver is holding and steering the steering wheel, and the application of the steering wheel return torque is stopped or suppressed.

CITATION LIST

Patent Literature

[PTL 1] JP 10-278829 A (pages 2 and 3, paragraphs 0001 to 0021, and FIG. 2 and FIG. 4)
[PTL 2] JP 2002-120745 A (pages 4, 5, and 8, and paragraphs 0031, 0036, and 0091 to 0093)
[PTL 3] JP 2006-123827 A (page 3, paragraph 0007, and FIG. 3)

SUMMARY OF INVENTION

Technical Problem

In the related-art steering control devices as described above, when the steering torque becomes larger than a predetermined threshold, the return control torque becomes zero. In steering-wheel return steering involving a large steering angle, the steering torque is large, and the return control is not activated until the steering torque falls below the threshold even after the driver releases the steering wheel from his/her hand. Accordingly, there is a problem in that the steering wheel return characteristics cannot be improved.

The present invention has been made in order to solve the problem as described above, and has an object of providing a steering control device and the like, which are capable of acquiring appropriate steering wheel return characteristics even in steering involving a large steering angle.

Solution to Problem

According to one embodiment of the present invention, there are provided a steering control device and the like, including: an actuator for applying a steering assist torque to a steering system of a vehicle; a steering torque detection section for detecting a steering torque acting on the steering system of the vehicle; a steering angle detection section for detecting a steering angle of the steering system of the vehicle; a steering assist torque calculation section for calculating a steering assist torque to be applied to the actuator in order to improve return characteristics of the steering system; a steering state determination section for determining a steering state of a driver; a steering assist torque correction section for correcting the steering assist torque depending on a steering state determination result of the steering state determination section; and an actuator control section for controlling the actuator depending on the corrected steering assist torque, in which the steering state determination section determines the steering state of the driver based on a combination of at least two of the following: a manually-operating steering determination section for determining a manually-operating steering state of the driver based on a result of comparing a magnitude of the steering torque to magnitudes of a plurality of steering torque thresholds; an abrupt steering wheel return determination section for determining an abrupt steering wheel return state based on a result of comparing a magnitude of a change amount of the steering torque to a magnitude of a steering torque change amount threshold; a high-acceleration steering wheel return determination section for determining a steering wheel return state involving high acceleration based on a result of comparing a magnitude of a steering acceleration of the steering system to a magnitude of a steering acceleration threshold; a manual turning-back steering determination section for determining a manual turning-back steering state of the driver based on a result of comparing a sign indicating a direction of the steering torque to a sign of the steering angle; and an additional-steering determination section for determining a steering-holding state of the steering system, storing the steering angle at a time of the determination as a steering-holding determination steering angle, and determining an additional-steering state of the driver based on a result of comparing a magnitude of the steering-holding determination steering angle to a magnitude of the steering angle, and in which the actuator control section drives the actuator depending on the steering assist torque that is corrected by the steering assist torque correction section based on the determination result of the steering state of the driver.

Advantageous Effects of Invention

According to the one embodiment of the present invention, it is possible to provide the steering control device and the like, which are capable of acquiring the appropriate steering wheel return characteristics even in the steering involving a large steering angle.

DESCRIPTION OF EMBODIMENTS

Figure 1:
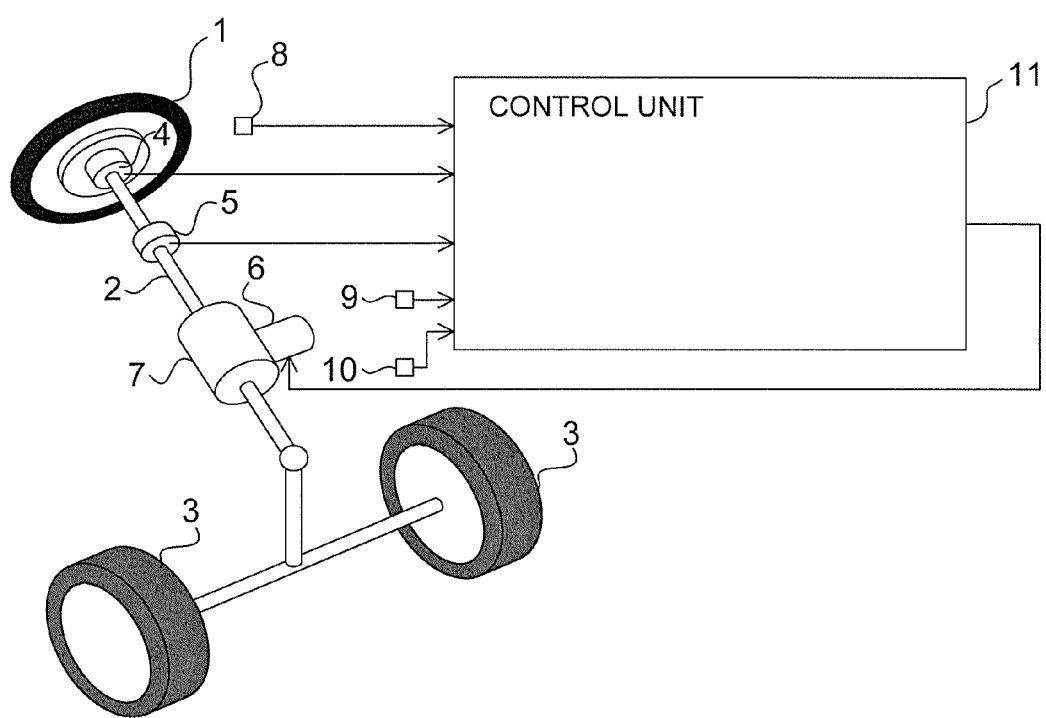
FIG. 1 is a diagram for illustrating an example of a configuration of a steering control device according to the present invention.

According to the present invention, a steering state of a driver is determined based on a combination of at least two of the following:
a manually-operating steering determination for determining a manually-operating steering state of the driver based on a result of comparing a magnitude of a steering torque to magnitudes of a plurality of steering torque thresholds;
an abrupt steering wheel return determination for determining an abrupt steering wheel return state based on a result of comparing a magnitude of a change amount of the steering torque to a magnitude of a steering torque change amount threshold;
a high-acceleration steering wheel return determination for determining a steering wheel return state involving high acceleration based on a result of comparing a magnitude of a steering acceleration of a steering system to a magnitude of a steering acceleration threshold;
a manual return steering determination for determining a manual return steering state of the driver based on a result of comparing a sign indicating a direction of the steering torque to a sign of a steering angle; and
an additional-steering determination for determining a steering-holding state of the steering system, storing the steering angle at a time of the determination as a steering-holding determination steering angle, and determining an additional-steering state of the driver based on a result of comparing a magnitude of the steering-holding determination steering angle to a magnitude of the steering angle. Consequently, the steering state of the driver can be determined more finely than hitherto, and a steering assist torque to be applied to an actuator in order to improve return characteristics of the steering system can be appropriately adjusted depending on the steering state. As a result, appropriate steering wheel return characteristics can be acquired even in steering involving a large steering angle.

Referring to the drawings, a steering control device and the like according to the present invention are now described by way of embodiments. Note that, the same or corresponding parts in the respective embodiments are denoted by the same reference symbols, and a repetitive description thereof is omitted.

First Embodiment

FIG. 1 is a diagram for illustrating an example of a configuration of the steering control device according to the present invention. Right and left steered wheels 3 are steered in response to rotation of a steering shaft 2 coupled to a steering wheel 1. A steering angle sensor 4 for detecting a steering angle is mounted to the steering wheel 1. A torque sensor 5 is mounted to the steering shaft 2 to detect a steering torque acting on the steering shaft 2. A motor 6 is coupled to the steering shaft 2 via a speed reduction mechanism 7, and can apply a steering assist torque generated by the motor 6 to the steering shaft 2. A vehicle speed of a vehicle is detected by a vehicle speed sensor 8. A current flowing through the motor 6 is detected by a current sensor 9. An inter-terminal voltage of the motor 6 is detected by a voltage sensor 10.

A control unit 11 calculates, for example, the steering assist torque to be generated by the motor 6, and controls the current of the motor 6 necessary for generating the steering assist torque. The control unit 11 includes a microcomputer (CPU) constructed by memories including a ROM and a RAM to be described later, a current driver 12 for driving the motor current (causing a desired current to flow through the motor 6), and the like.

Next, the calculation of the steering assist torque by the control unit 11, which is a main part, according to this embodiment is described with reference to a block diagram illustrated in FIG. 2 and a flowchart illustrated in FIG. 3. Note that, the operation illustrated in the flowchart is repeatedly executed at a control cycle of a predetermined period.

Figure 2:
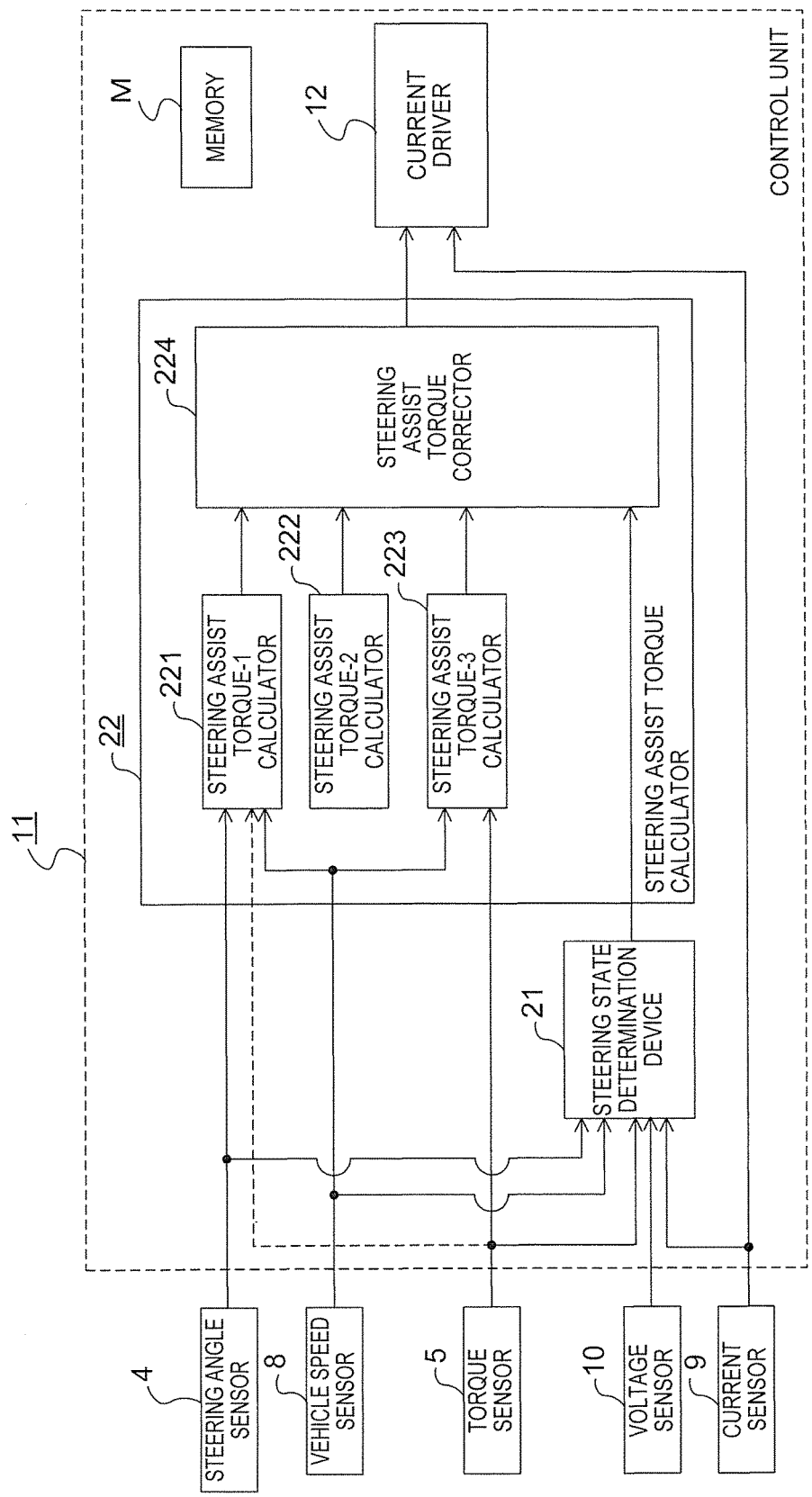
FIG. 2 is a block diagram for illustrating an example of a configuration of a main part of the steering control device according to a first embodiment of the present invention.

In FIG. 2, the control unit 11 includes the current driver 12, a steering state determination device 21 and a steering assist torque calculator 22, which are constructed by the microcomputer, and a memory (device) M. Then, for example, the steering angle sensor 4, the vehicle speed sensor 8, the torque sensor 5, and the current sensor 9 are connected to the control unit 11. In the memory M, various kinds of data and information used by the microcomputer are stored.

The steering assist torque calculator 22 includes a steering assist torque-1 calculator 221, a steering assist torque-2 calculator 222, a steering assist torque-3 calculator 223, and a steering assist torque corrector 224.

Figure 3:
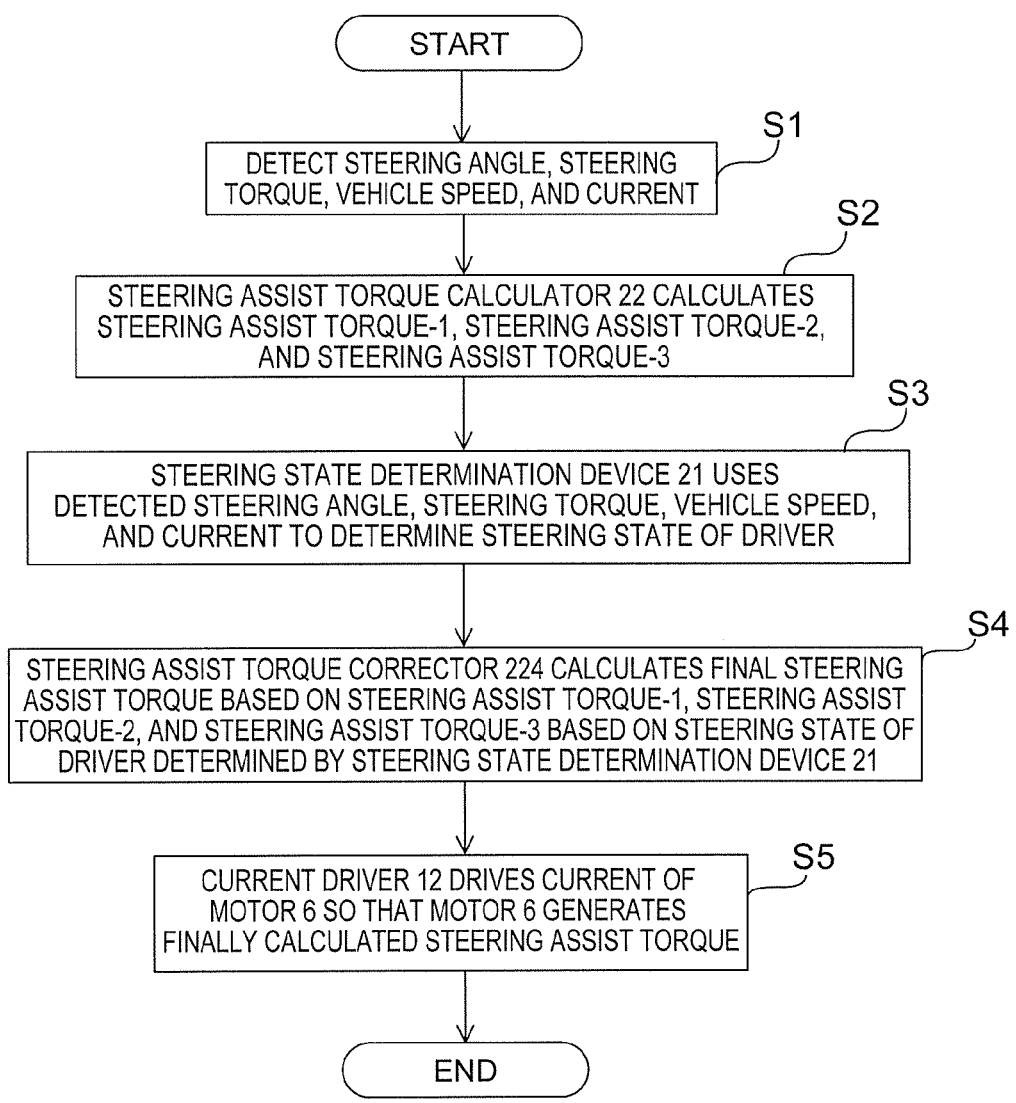
FIG. 3 is an operation flowchart for illustrating an example of an operation of the main part of the steering control device according to the first embodiment of the present invention.

In the operation flowchart of FIG. 3, in Step S1, the steering angle sensor 4, the torque sensor 5, the vehicle speed sensor 8, and the current sensor 9 are used to detect the steering angle, the steering torque, the vehicle speed of the vehicle, and the current flowing through the motor 6, respectively.

In Step S2, the steering assist torque calculator 22 calculates a steering assist torque-1, a steering assist torque-2, and a steering assist torque-3 based on the steering angle, the steering torque, and the vehicle speed. In this embodiment, the steering assist torque-1 is a steering assist torque for generating a steering wheel return torque by the motor 6 in order to improve steering wheel return characteristics at the time when the driver releases the steering wheel from his/her hand at low vehicle speed. The configuration of the steering assist torque-1 calculator 221 for calculating the steering assist torque-1 is described.

Figure 4:
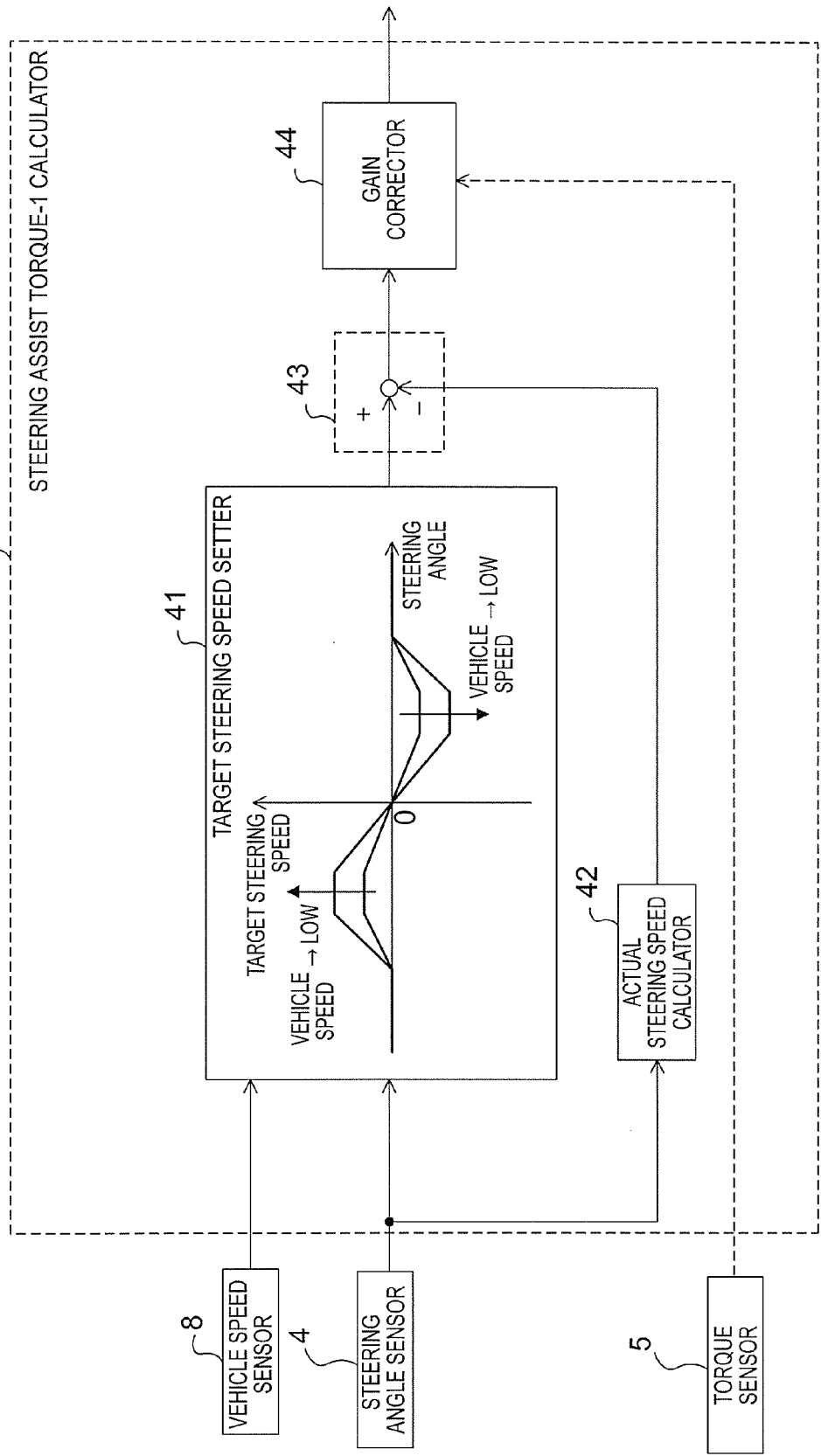
FIG. 4 is a block diagram for illustrating an example of a configuration of a steering assist torque-1 calculator according to the first embodiment of the present invention.

A block diagram of the steering assist torque-1 calculator 221 is illustrated in FIG. 4. In a target steering speed setter 41, a target steering speed corresponding to the steering angle and the vehicle speed is set as map data in advance (stored in the memory in an actual case), and the target steering speed corresponding to the detected steering angle and the detected vehicle speed is calculated. In order to improve the return of the steering wheel 1 to a neutral position, the target steering speed is set to have the sign opposite to that of the steering angle (opposite direction), and is set so that the magnitude of the target steering speed becomes larger as the vehicle speed becomes lower. Then, for example, the target steering speed has such characteristics that, under the same vehicle speed, the target steering speed first increases in the range of steering angles of from zero to, for example, a reference steering angle along with an increase in magnitude (absolute value) of the steering angle, but subsequently decreases after reaching the maximum target steering speed.

An actual steering speed calculator 42 calculates an actual steering speed, which is a steering speed of the steering wheel 1, based on the steering angle.

A subtractor 43 subtracts the actual steering speed from the target steering speed, to thereby calculate a steering speed deviation.

A gain corrector 44 multiplies the steering speed deviation by a predetermined gain, to thereby calculate the steering assist torque-1.

Next, the configuration of the steering assist torque-2 calculator 222 for calculating the steering assist torque-2 is described. In this embodiment, the steering assist torque-2 is a steering assist torque to be switched from the steering assist torque-1 depending on a determination result of the steering state determination device 21, and the steering assist torque-2 is set to be zero. In other words, the steering assist torque-2 is a steering assist torque to be set for stopping the application of the steering assist torque-1. Note that, for the above-mentioned reason, the steering assist torque-2 is not limited to zero and only needs to be a value smaller than the steering assist torque-1.

The steering assist torque-3 calculator 223 for calculating the steering assist torque-3 calculates a steering assist torque calculated by a related-art steering control device. For example, in this embodiment, a steering assist torque for assisting the steering by the driver corresponding to the steering angle and the vehicle speed is set (stored in the memory M) in advance as map data as exemplified by an assist map shown in FIG. 5, and the steering assist torque-3 is calculated depending on the detected steering torque and the detected vehicle speed.

Figure 5:
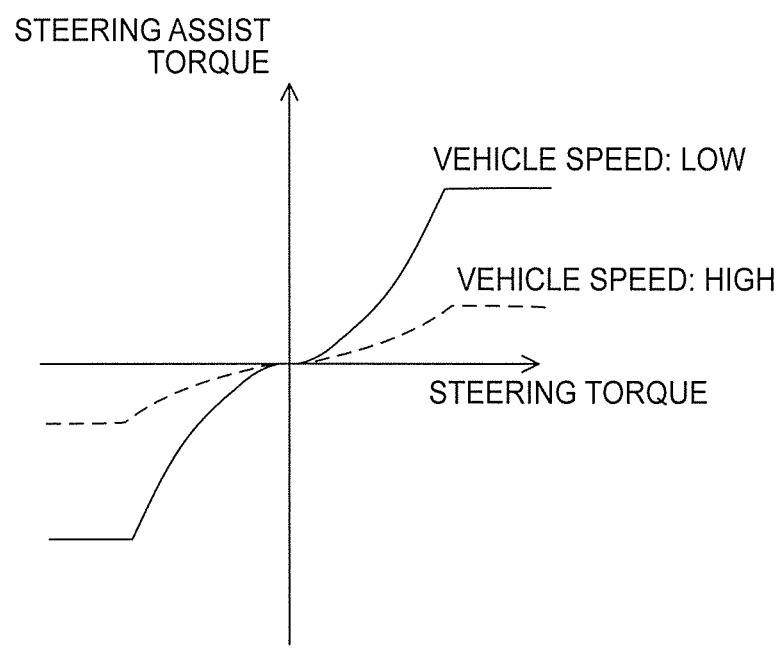
FIG. 5 is a graph for showing an example of an assist map according to the first embodiment of the present invention.

In the assist map of FIG. 5, in a region in which the magnitude (absolute value) of the steering torque is small, the gradient of the assist map, that is, an increase amount of the value of the steering assist torque with respect to an increase in steering torque is small, and the gradient becomes gradually larger as the steering torque increases. When a predetermined steering assist torque is reached, the steering assist torque does not increase any more but becomes constant. The assist map is set so that the magnitude of the steering assist torque becomes larger as the vehicle speed becomes lower.

In Step S3, the steering state determination device 21 determines a steering state of the driver based on the steering angle sensor, the steering torque sensor, the vehicle speed sensor, and the current sensor.

Figure 6:
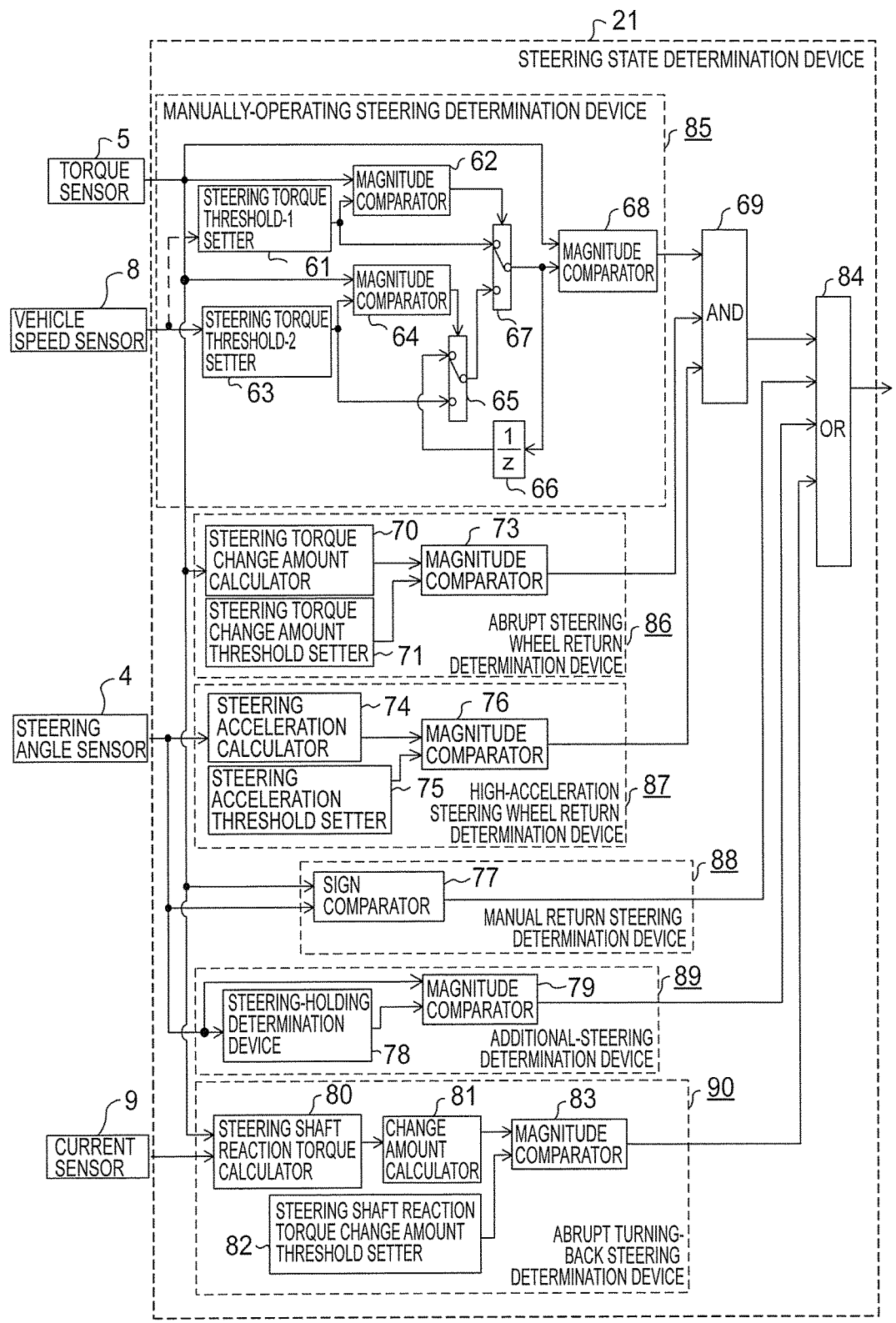
FIG. 6 is a block diagram for illustrating an example of a configuration of a steering state determination device according to the first embodiment of the present invention.

A block diagram of the steering state determination device 21 is illustrated in FIG. 6. The steering state determination device 21 includes six novel steering state determination sections. All of those determination sections are determination sections for determining the steering state of the driver for the purpose of acquiring appropriate steering wheel return characteristics even in steering involving a large steering angle. The steering state determination device 21 determines the steering state of the driver based on a combination of at least two of the six steering state determination sections.

A manually-operating steering determination device 85 uses the steering torque and the vehicle speed to determine whether or not the driver is holding and steering the steering wheel 1. Then, when it is determined that the driver is holding and steering the steering wheel 1, the manually-operating steering determination device 85 switches the steering assist torque-1, which is used to improve the return of the steering wheel 1 to a neutral position, to the steering assist torque-2 of zero.

A steering torque threshold-1 setter 61 sets a predetermined steering torque threshold 1 (ATh1). A steering torque threshold-2 setter 63 sets a predetermined steering torque threshold 2 (ATh2) corresponding to the vehicle speed. The steering torque threshold 2 is set so that the magnitude thereof becomes larger as the vehicle speed becomes higher. In this case, the steering torque threshold 2 is set larger than the steering torque threshold 1.

A magnitude comparator 62 compares an absolute value |Ta| of the steering torque to the steering torque threshold 1. When the absolute value of the steering torque is equal to or smaller than the steering torque threshold 1 ($|Ta| \leq ATh1$), a selector 67 outputs the steering torque threshold 1. When the absolute value of the steering torque is larger than the steering torque threshold 1 ($|Ta| > ATh1$), the selector 67 outputs an output of a selector 65.

A magnitude comparator 64 compares the absolute value of the steering torque to the steering torque threshold 2. When the absolute value of the steering torque is equal to or smaller than the steering torque threshold 2 ($|Ta| \leq ATh2$), the selector 65 selects an output of a previous-value output device (delay device) 66. Symbol 1/z of the previous-value output device 66 represents a delay element. In other words, the selector 65 outputs a previous value of a steering torque threshold 3 (ATh3), which is the output of the selector 67 calculated based on the result of comparing the magnitude of the steering torque to the magnitude of the steering torque threshold 1 and the result of comparing the magnitude of the steering torque to the magnitude of the steering torque threshold 2.

When the magnitude comparator 64 determines that the absolute value of the steering torque is larger than the steering torque threshold 2 (|Ta|>ATh2), the steering torque threshold 2 is selected. A magnitude comparator 68 compares the absolute value of the steering torque to the output of the selector 67, that is, the steering torque threshold 3. When the absolute value of the steering torque is equal to or larger than the steering torque threshold 3 (|Ta|ATh3), the magnitude comparator 68 determines that the driver is holding and steering the steering wheel 1, and outputs "1" (logic value "1"; the same applies hereinafter). When the absolute value of the steering torque is smaller than the steering torque threshold 3 (|Ta|<ATh3), the magnitude comparator 68 determines that the driver is not holding and steering the steering wheel 1, and outputs "0" to an AND device 69.

An abrupt steering wheel return determination device 86 detects, at the start of steering-wheel return steering involving a large steering angle, an abrupt decrease in steering torque caused when a transition has been made from the state in which the driver holds the steering wheel to the state in which the driver releases the steering wheel from his/her hand.

A steering torque change amount calculator 70 differentiates the steering torque to calculate a steering torque change amount Ta'. A steering torque change amount threshold setter 71 sets a predetermined steering torque change amount threshold (BTh1). When an absolute value of the steering torque change amount is equal to or larger than the steering torque change amount threshold (|Ta'|≥BTh1), a magnitude comparator 73 determines that, at the start of the steering-wheel return steering involving a large steering angle, a transition has been made from the state in which the driver holds the steering wheel to the state in which the driver releases the steering wheel from his/her hand, and outputs "0" to the AND device 69. In other cases, the magnitude comparator 73 outputs "1" to the AND device 69.

Note that, the steering torque is large in a region in which the steering angle is large and a road surface reaction torque for returning the steering wheel 1 to a neutral position is large, and hence the abrupt steering wheel return determination may be implemented in a region in which the magnitude of the steering torque is larger than a steering torque threshold 4 (ATh4). Alternatively, the signs (directions; the same applies hereinafter) of the steering torque and the steering torque change amount may be compared to each other, and the abrupt steering wheel return determination device 86 may be implemented in a situation in which the signs are different from each other, that is, a situation in which the absolute value of the steering torque is decreasing. Alternatively, the sign of the steering angle and the sign of a steering angular speed may be compared to each other, and the abrupt steering wheel return determination device 86 may be implemented in a situation in which the signs are different from each other, that is, a situation in which the driver performs the return steering of steering the steering wheel toward the neutral position.

Those determinations are performed, for example, by the steering torque change amount calculator 70 based on information from a sensor or the like.

Through the addition of those conditions, the state in which a transition has been made from the state in which the driver holds the steering wheel to the state in which the driver releases the steering wheel from his/her hand can be more accurately detected at the start of the steering-wheel return steering involving a large steering angle.

The AND device 69 calculates logical AND of the output of the magnitude comparator 68, the output of the magnitude comparator 73, and an output of a magnitude comparator 76 to be described later. In other words, even in the situation in which the manually-operating steering determination device 85 determines that the driver is holding and steering the steering wheel 1, it can be determined that a transition has been made from the state in which the driver holds the steering wheel to the state in which the driver releases the steering wheel from his/her hand, and the AND device 69 outputs "0" to an OR device 84 so that the steering assist torque-1 is applied in order to prevent an abrupt increase in return speed.

A high-acceleration steering wheel return determination device 87 detects, in steering-wheel hands-free steering from a large steering angle, an abrupt increase in return speed at the time of the return of the steering wheel 1 caused by the action of a large road surface reaction torque, to thereby determine a steering wheel return state involving high acceleration.

A steering acceleration calculator 74 differentiates a steering angle θh detected by the steering angle sensor 4 to calculate a steering speed θh '. The steering acceleration calculator 74 further differentiates the steering speed to calculate a steering acceleration θh ". A steering acceleration threshold setter 75 sets a predetermined steering acceleration threshold CThl. A magnitude comparator 76 compares an absolute value of the steering acceleration to the steering acceleration threshold. When the absolute value of the steering acceleration is equal to or larger than the steering acceleration speed threshold (|θh"|≥CTh1), the magnitude comparator 76 determines that the steering wheel 1 is in an abrupt return speed increasing state, and outputs "0" to the AND device 69. In other cases, the magnitude comparator 76 outputs "1" to the AND device 69.

Note that, the steering torque is large in a region in which the steering angle is large and the road surface reaction torque for returning the steering wheel 1 to the neutral position is large, and hence the high-acceleration steering wheel return determination device 87 may be implemented in a region in which the magnitude of the steering torque is larger than the steering torque threshold 4 (ATh4). Alternatively, the sign of the steering angle, the sign of the steering speed, and the sign of the steering acceleration may be compared to one another, and the high-acceleration steering wheel return determination device 87 may be implemented in a situation in which the steering angle and the steering speed have different signs and the steering angle and the steering acceleration have different signs, that is, a situation in which the driver performs the return steering of steering the steering wheel toward the neutral position and the magnitude of the return speed is increasing.

Those determinations are performed, for example, by the steering acceleration calculator 74 based on information from a sensor or the like.

Through the addition of those conditions, an abrupt increase in return speed at the time of the return of the steering wheel 1 can be more accurately detected in the steering-wheel return steering involving a large steering angle.

The AND device 69 calculates logical AND of the output of the magnitude comparator 68, the output of the magnitude comparator 73, and the output of the magnitude comparator 76, and hence, even in the situation in which the manually-operating steering determination device 85 determines that the driver is holding and steering the steering wheel 1, in the steering-wheel hands-free steering from a large steering angle, it can be determined that the steering state is in the steering wheel return state involving high acceleration caused by the action of a large road surface reaction torque, and the AND device 69 outputs "0" to the OR device 84 so that the steering assist torque-1 is applied in order to prevent an abrupt increase in return speed.

The manual return steering determination device 88 determines, in steering-wheel return steering from a large steering angle at the time when the vehicle speed is low and the road surface reaction torque for returning the steering wheel 1 to the neutral position is small, a situation in which the steering wheel 1 does not return to a neutral point unless the driver applies the steering torque on his/her own in the direction of returning the steering wheel 1 to the neutral position.

When a sign comparator 77 determines that the signs (directions) of the steering torque and the steering angle are opposite to each other, the manual return steering determination device 88 determines that the current situation is the situation in which the steering wheel 1 does not return to the neutral point unless the driver applies the steering torque on his/her own in the direction of returning the steering wheel 1 to the neutral position, and outputs "0" to the OR device 84. In other cases, the manual return steering determination device 88 outputs "1" to the OR device 84.

The situation in which the signs of the steering torque and the steering angle are opposite to each other is a situation in which, when the steering wheel 1 is attempted to be returned to the neutral position from the current steering angle, a resistive torque such as friction included in the steering system is larger than the road surface reaction torque acting to return the steering wheel 1 in the neutral direction. The related-art steering control devices are configured to apply the steering assist torque-1 when the magnitude of the steering torque is small. When the driver intends to return the steering wheel 1 to the neutral position at a steering speed equal to or higher than the target steering speed, the steering assist torque-1 may serve as an additional resistive torque with respect to the driver's return steering so that the driver's steering torque may be increased, thus leading to a feel of discomfort. Due to the provision of the manual return steering determination device 88, in such a situation, the steering assist torque can be switched to be zero, to thereby prevent an increase in driver's steering torque.

Note that, the manual return steering determination device 88 may be implemented in a region in which the magnitude of the steering torque is larger than a steering torque threshold 5 (ATh5). With this configuration, a determination can be stopped in a situation in which the steering torque is near zero and the sign of the steering torque frequently changes.

Those determinations are performed, for example, by the sign comparator 77 based on information from a sensor or the like.

An additional-steering determination device 89 determines a state in which the driver steers the steering wheel 1 from the neutral position side in a direction in which the steering angle becomes larger.

A steering-holding determination device 78 calculates the steering speed θh' based on the steering angle θh, and determines a situation in which the magnitude of the steering speed is small and there is little movement of the steering wheel 1 as a steering-holding state. The steering-holding determination device 78 stores a steering angle at the time of this determination as a steering-holding determination steering angle (stores in the memory M). A magnitude comparator 79 compares the steering angle to a steering-holding determination steering angle Eθhth. When the magnitude of the steering angle is equal to or larger than the magnitude of the steering-holding determination steering angle (|θh|≥Eθhth), the magnitude comparator 79 determines that the additional steering is performed, and outputs "0" to the OR device 84. In other cases, the magnitude comparator 79 outputs "1" to the OR device 84.

Due to the provision of the additional-steering determination device 89, in the additional steering that requires no application of the return control, the application of the steering assist torque-1 can be stopped, and at the start of the return steering, the return control can be applied because the steering angle becomes smaller than the steering-holding determination steering angle. In addition, in the hands-free steering from a large steering angle, in a situation in which the road surface reaction torque is large and such overshoot that the steering wheel 1 excessively returns beyond the neutral position occurs, which is otherwise determined as the additional steering, a large steering angle at the time of the release of the steering wheel from the driver's hand is stored as the steering-holding determination steering angle, and the steering angle at the time of the overshoot is smaller than the steering-holding determination steering angle, and hence the steering-holding determination device 78 does not determine that the additional steering is performed, but can continue the application of the return control. Consequently, the steering assist torque for suppressing the overshoot speed can be applied to suppress the overshoot to a low level. Consequently, appropriate steering wheel return characteristics can be realized.

An abrupt turning-back steering determination device 90 detects a situation in which the magnitude of a change amount of a steering shaft reaction torque is large, and determines that abrupt turning-back steering of the steering wheel 1 is performed by the driver. As used herein, the turning-back steering means steering in which the return steering is performed continuously from the additional steering.

A steering shaft reaction torque calculator 80 calculates a steering shaft reaction torque acting on the steering shaft 2 based on the current flowing through the motor 6 detected by the current sensor 9 and the steering torque detected by the torque sensor 5. When the steering shaft reaction torque is represented by $T_{rtss}$; the steering torque, $T_{sens}$; the current, $I_m$; a torque constant of the motor 6, $K_t$; and a reduction gear ratio of the speed reduction mechanism 7, $G_{gear}$, the steering shaft reaction torque is calculated by calculating Expression (1).

$$T_{rtss}=T_{sens}+G_{gear}K_tI_m \qquad [\text{Ex. 1}]$$

In Expression (1), $G_{gear}K_tI_m$ represents an actual steering assist torque to be applied to the steering shaft 2 by the motor 6.

A change amount calculator 81 differentiates the steering shaft reaction torque to calculate a change amount $T_{rtss}'$ of the steering shaft reaction torque. A steering shaft reaction torque change amount threshold setter 82 sets a steering shaft reaction torque change amount threshold FTh1. The set value thereof is larger than a steering shaft reaction torque change amount that is generated when the driver releases the steering wheel from his/her hand from a large steering angle.

When the magnitude of the change amount of the steering shaft reaction torque is larger than the steering shaft reaction torque change amount threshold ($T_{rtss}'$>FTh1), a magnitude comparator 83 determines that the abrupt turning-back steering is performed by the driver, and outputs "0" to the OR device 84 in order to reduce the application of the steering assist torque-1. In other cases, the magnitude comparator 83 outputs "1" to the OR device 84.

The steering shaft reaction torque represents a reaction torque acting on the steering shaft, and corresponds to the sum of friction and a road surface reaction torque that act on the steering shaft. When the value of the steering shaft reaction torque changes with a change amount larger than a change amount that is generated in the normal hands-free steering, it can be determined that the change amount is increasing because of the intervention of the steering by the driver, and it is determined that the abrupt turning-back steering of the steering wheel 1 is performed by the driver.

The related-art steering control devices are configured to apply the steering assist torque-1 when the magnitude of the steering torque is small. According to the configuration of the present invention, however, the application of the steering assist torque-1 can be reduced when the driver actively turns back the steering wheel, and hence an increase in driver's steering torque can be suppressed to acquire an appropriate steering feeling.

The OR device 84 calculates logical OR of the determination result of the manually-operating steering determination device 85, the determination result of the abrupt steering wheel return determination device 86, the determination result of the high-acceleration steering wheel return determination device 87, the determination result of the manual return steering determination device 88, the determination result of the additional-steering determination device 89, and the determination result of the abrupt turning-back steering determination device 90, or more accurately, calculates logical OR of the result of logical AND of the determination result of the manually-operating steering determination device 85, the determination result of the abrupt steering wheel return determination device 86, and the determination result of the high-acceleration steering wheel return determination device 87, the determination result of the manual return steering determination device 88, the determination result of the additional-steering determination device 89, and the determination result of the abrupt turning-back steering determination device 90.

When the logical OR is "0", the current situation is determined to be a situation of applying the return torque, and the steering assist torque-1 is applied through processing to be described later. When the logical OR is "1", the current situation is not determined to be a situation of applying the return torque, and the application of the steering assist torque-1 is reduced through the processing shown in Step S4.

Returning to FIG. 3, in Step S4, the steering assist torque corrector 224 calculates, based on the steering state of the driver determined by the steering state determination device 21, a final steering assist torque from the steering assist torque-1, the steering assist torque-2, and the steering assist torque-3. A block diagram for illustrating the configuration of the steering assist torque corrector 224 is illustrated in FIG. 7.

Figure 7:
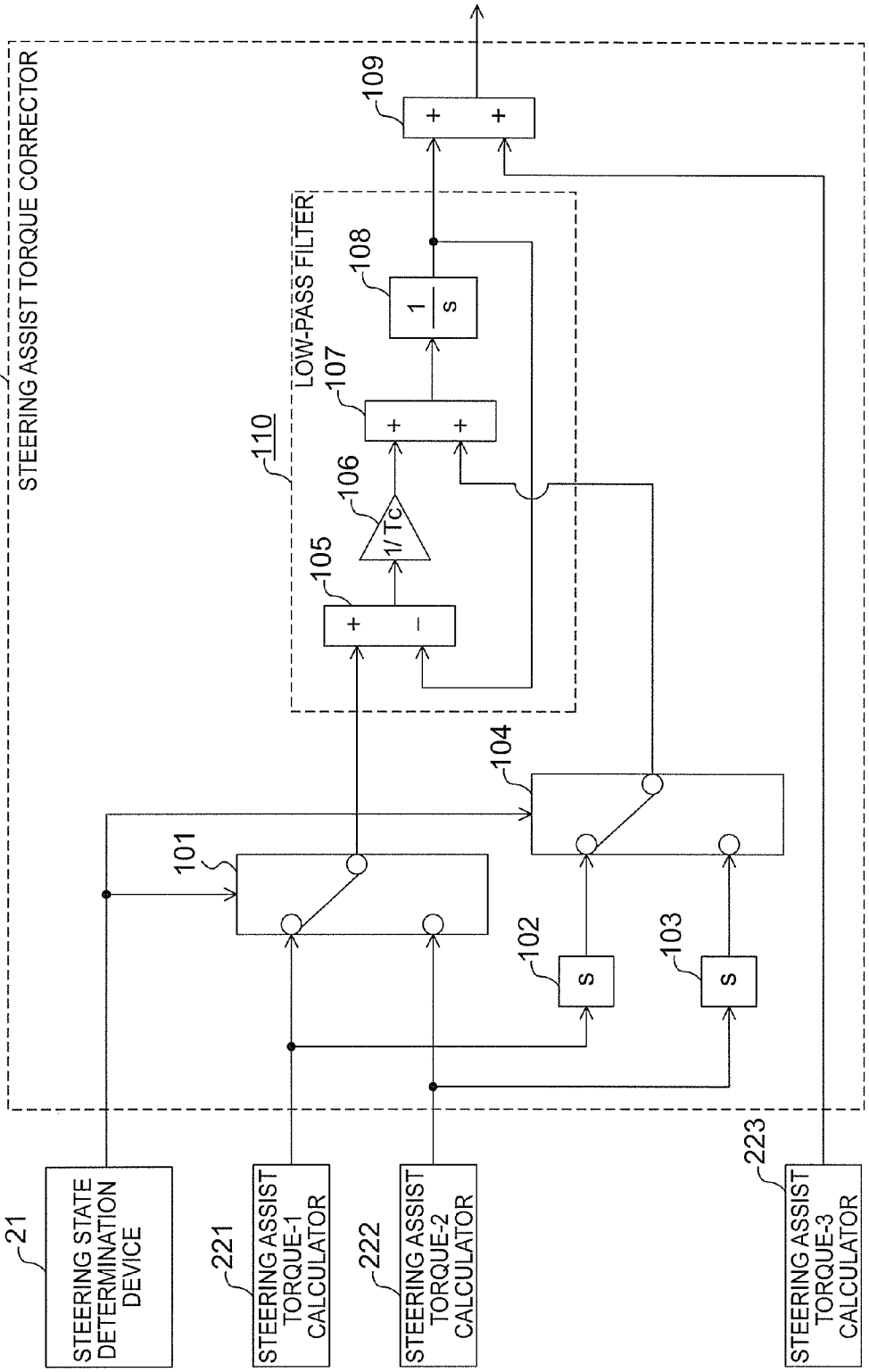
FIG. 7 is a block diagram for illustrating an example of a configuration of a steering assist torque corrector according to the first embodiment of the present invention.

In FIG. 7, the steering assist torque corrector 224 includes differentiators 102 and 103, switches 101 and 104, a low-pass filter 110, and an adder 109. Then, the steering state determination device 21, the steering assist torque-1 calculator 221, the steering assist torque-2 calculator 222, and the steering assist torque-3 calculator 223 are connected to the steering assist torque corrector 224. The low-pass filter 110 includes a subtractor 105, a multiplier 106, an adder 107, and an integrator 108.

The switch 101 switches an output signal depending on a determination result of the steering state determination device 21. In this embodiment, when the steering state determination device 21 outputs "1", the switch 101 selects the steering assist torque-2, and output the value of zero. When the steering state determination device 21 outputs "0", the switch 101 selects and outputs the steering assist torque-1.

The differentiator 102 differentiates the steering assist torque-1 to calculate a change amount of the steering assist torque-1. In FIG. 7, symbol s represents the Laplace operator. The differentiator 103 differentiates the steering assist torque-2 to calculate a change amount of the steering assist torque-2.

The switch 104 switches an output signal depending on a determination result of the steering state determination device 21. In this embodiment, when the steering state determination device 21 outputs "1", the switch 104 selects and outputs the change amount of the steering assist torque-2. The steering assist torque-2 is zero, and hence the change amount of the steering assist torque-2 is also zero. When the steering state determination device 21 outputs "0", the switch 104 selects and outputs the change amount of the steering assist torque-1.

The subtractor 105 subtracts an output of the integrator 108 from the output of the switch 61, and outputs the resultant. The multiplier 106 multiplies the output of the subtractor 105 by the reciprocal of a filter time constant Tc, and outputs the resultant. The adder 107 adds the output of the multiplier 106 and the output of the switch 104 together, and outputs the resultant. The integrator 108 integrates the output of the adder 107, and outputs the resultant. The output of the integrator 108 corresponds to a steering assist torque corrected by the steering assist torque corrector 244, which is a main part of this embodiment.

The adder 109 adds the output of the integrator 108 and the steering assist torque-3 serving as a reference steering assist torque together, and outputs the final steering assist torque.

Now, a correspondence to the configuration in the related-art in which the steering assist torque is simply subjected to low-pass filtering is described. A low-pass filter in the related art corresponds to a configuration obtained by excluding the adder 107 from the broken-line section 110 of FIG. 6. In the low-pass filter in the related art, the input to the integrator 108, that is, the output of the multiplier 106 corresponds to a change amount of an output signal of the low-pass filter. Accordingly, the input to the integrator 108, that is, the output of the multiplier 106 is referred to as "change amount of filtering".

In Step S5, the current driver 12 drives the current of the motor 6 so that the motor 6 generates the finally calculated steering assist torque.

Note that, the current driver 12 generally performs feedback control based on a current value of the motor 6 supplied from the current sensor 9, but the present invention is not limited thereto.

Next, effects of this embodiment are described. In the steering-wheel return steering involving a large steering angle, a large steering torque is also generated, and even after the driver releases the steering wheel from his/her hand, it takes time for the steering torque to be zero. Accordingly, in the related-art steering control devices, the return control torque is not applied until the steering torque falls below a predetermined threshold, and the return control is not activated and the abrupt steering wheel return speed cannot be suppressed, with the result that the steering wheel return characteristics cannot be improved.

With the configuration of the manually-operating steering determination device 85, in the return steering from a large steering angle, the steering torque threshold 2 (ATh2) that is larger than the steering torque threshold 1 (ATh1) is selected, and the time for the steering torque to fall below the steering torque threshold is shortened, and hence the steering assist torque can be applied at an early point to improve the steering wheel return characteristics. Besides, in the additional steering from the neutral position, the steering torque threshold 1 (ATh1) is selected, and the steering torque threshold can be set small, and hence the application of the steering assist torque can be turned off at an early point. Consequently, even in the steering involving a large steering angle, appropriate steering wheel return characteristics can be acquired.

Further, at least one of the steering torque threshold 1 or the steering torque threshold 2 may be changed depending on the vehicle speed. With this configuration, an appropriate steering torque threshold can be set depending on the vehicle speed. By setting the steering torque threshold 2 to be larger as the vehicle speed increases, in a situation in which the vehicle speed is high and the road surface reaction torque is so large that the return speed is liable to be increased, the control of improving the steering wheel return characteristics can be applied at an early point.

With the configuration of the abrupt steering wheel return determination device 86, even in the situation in which a large steering torque is generated in the return steering from a large steering angle, by determining the abrupt steering wheel return state based on the result of comparing the magnitude of the change amount of the steering torque to the magnitude of the steering torque change amount threshold, the steering assist torque can be applied even in the period until the steering torque falls below a predetermined threshold during which the steering assist torque is not applied in the steering-wheel return steering involving a large steering angle. Consequently, appropriate steering wheel return characteristics can be acquired.

With the configuration of the high-acceleration steering wheel return determination device 87, even in the situation in which a large steering torque is generated in the return steering from a large steering angle, by detecting an abrupt increase in return speed at the time of the return of the steering wheel 1 to determine the steering wheel return state involving high acceleration, the steering assist torque-1 for preventing an abrupt increase in return speed can be applied. Consequently, appropriate steering wheel return characteristics can be acquired.

With the configuration of the manual return steering determination device 88, in the steering-wheel return steering from a large steering angle at the time when the vehicle speed is low and the road surface reaction torque for returning the steering wheel 1 to the neutral position is small, in the situation in which the steering wheel 1 does not return to the neutral point unless the driver applies the steering torque on his/her own in the direction of returning the steering wheel 1 to the neutral position, the steering assist torque-1 can be turned off or suppressed to prevent an increase in steering torque. Consequently, appropriate steering wheel return characteristics can be acquired.

In particular, in the case where it is determined that the steering wheel is in the return state when the signs of the steering speed and the steering torque are different from each other as in the related art, the determination is affected by noise contained in the steering speed, and hence an erroneous determination may be made in the steering at low steering speed. According to the configuration of the present invention, the steering angle need not be differentiated, and hence the determination is less affected by noise, and the manual return steering state of the driver can be determined even in the steering with low steering speed.

With the configuration of the additional-steering determination device 89, in the hands-free steering from a large steering angle, in the situation in which the road surface reaction torque is large and such overshoot that the steering wheel 1 excessively returns beyond the neutral position occurs, the steering assist torque for suppressing the overshoot speed can be applied to suppress the overshoot to a low level, and in the additional-steering by the driver, the application of the steering assist torque-1 can be stopped to prevent an increase in driver's steering torque. Consequently, appropriate steering wheel return characteristics can be realized in the steering-wheel return steering involving a large steering angle. In contrast, in the case where it is determined that the steering wheel is in the return state when the signs of the steering speed and the steering torque are different from each other as in the related art, the situation in which the overshoot is increasing may be determined as the additional steering, and the application of the steering assist torque for suppressing the overshoot speed may be stopped, with the result that the overshoot may be increased.

With the configuration of the abrupt turning-back steering determination device 90, in the situation in which the abrupt turning-back steering of the steering wheel 1 is performed by the driver, the steering assist torque-1 can be turned off or suppressed to prevent an increase in steering torque. Consequently, appropriate steering wheel return characteristics can be acquired.

Figure 8:
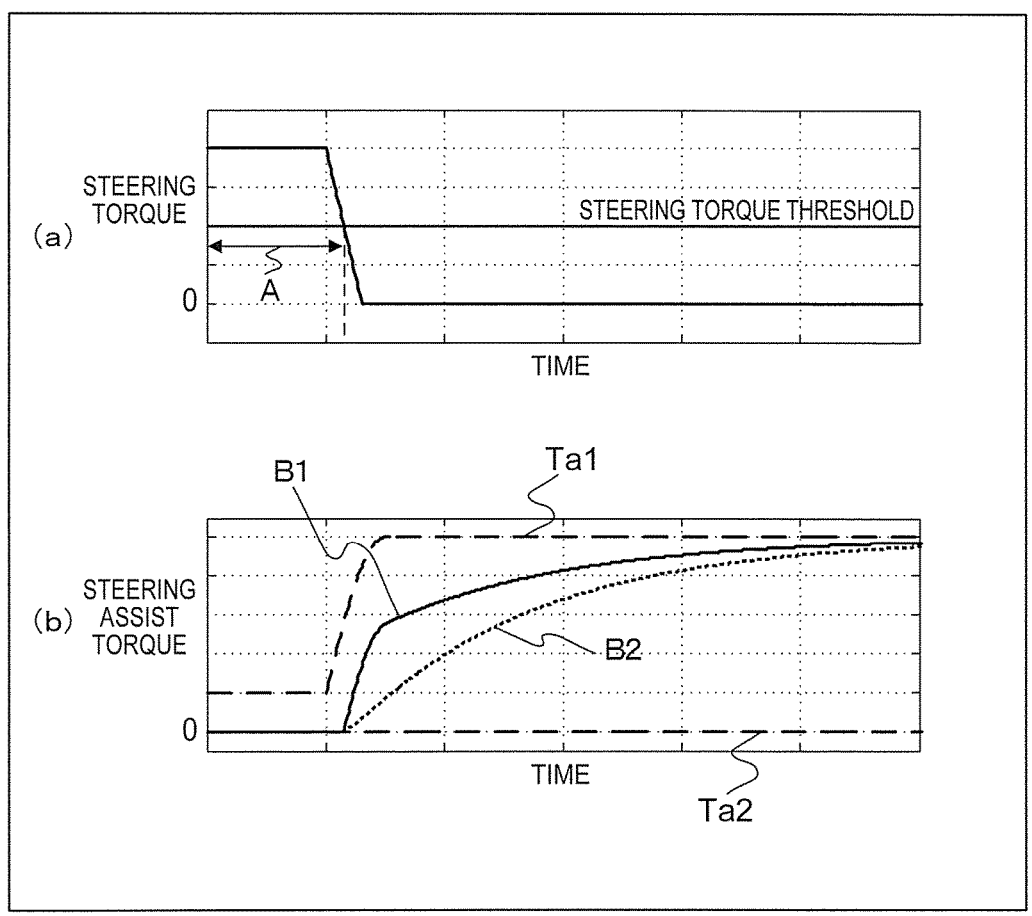
FIG. 8 is a graph for showing an effect of the steering control device according to the present invention.

Further, the adder 107 is added to the low-pass filtering indicated by the broken-line section 110 of FIG. 7 so as to provide processing of correcting the change amount of filtering by adding the change amount of the steering assist torque selected by the switch 101. The effect thereof is shown in FIG. 8. In FIG. 8, the output of the integrator 108 is shown on the assumption that the driver releases the steering wheel 1 from his/her hand in a region in which the steering angle is large.

In part (a) of FIG. 8, a temporal change in steering torque is shown, and symbol A represents the period during which the steering-holding state is determined to be established. In part (b) of FIG. 8, a temporal change in calculated steering assist torque is shown, and symbol B1 represents a steering assist torque obtained by the processing of the low-pass filter in the present invention, symbol B2 represents a steering assist torque obtained by the processing of the related-art low-pass filter, symbol Ta1 represents the steering assist torque-1, and symbol Ta2 represents the steering assist torque-2.

In the case where the driver releases the steering wheel 1 from his/her hand in the region in which the steering angle is large, a road surface reaction torque acting to return the steering wheel 1 to the neutral position is large, and hence an actual speed of returning the steering wheel 1 to the neutral position, which is higher than the target steering speed, is generated. As a result, the steering wheel 1 abruptly returns to the neutral position, and hence the driver feels discomfort. In order to reduce the feeling of discomfort, it is preferred that the steering wheel 1 return appropriately slowly.

The steering assist torque-1 calculator 221 calculates the steering assist torque based on the deviation between the target steering speed and the actual steering speed, and hence when the actual steering speed is higher than the target steering speed, the steering assist torque-1 is calculated so that the actual steering speed is suppressed to slowly return the steering wheel 1.

The steering assist torque-1 (Ta1) in part (b) of FIG. 8 shows that the steering assist torque for suppressing the actual steering speed is increased when the driver releases the steering wheel 1 from his/her hand. The steering assist torque-2 (Ta2) is always zero. As shown in part (a) of FIG. 8, in the period (A) during which the steering torque exceeds the steering torque threshold and the steering-holding state is determined to be established, the steering assist torque-2 (Ta2) is selected. When the steering torque falls below the steering torque threshold, the steering assist torque-1 (Ta1) is selected.

At the timing of switching of the steering assist torque, the steering assist torque-1 (Ta1) and the steering assist torque-2 (Ta2) have different values. Accordingly, if the steering assist torque is simply switched in a manner exemplified by a switch, an abrupt change in steering assist torque caused by a difference between both the steering assist torques makes even the driver feel discomfort. This feeling of discomfort corresponds to impact caused by the pulsed abrupt change disclosed in Patent Literature 1.

With the steering assist torque B2 in part (b) of FIG. 8 obtained by the processing of the low-pass filter in the related art, an offset abrupt change caused by the difference between both the steering assist torques is suppressed to be a gradual change, and hence the feeling of discomfort is suppressed. However, the response is delayed due to the low-pass filter, with the result that the rise of the steering assist torque-1 for suppressing an abrupt return speed of the steering wheel 1 is delayed. As a result, there arises a problem in that the abrupt return speed of the steering wheel 1 may be generated to give the driver a feeling of discomfort.

On the other hand, the steering assist torque B1 in part (b) of FIG. 8 obtained by the processing of the low-pass filter in the present invention shows the output of the integrator 108 according to this embodiment. As a result of correcting the filtering so that the change amount of the selected steering assist torque-1 is added to the output of the multiplier 106 in the adder 107, the offset abrupt change at the timing of switching of the steering assist torque is prevented so that the steering assist torque is switched smoothly, and after the switching, the output of the integrator 108 changes in the same manner as the change in steering assist torque-1. In other words, the response delay is suppressed, and the steering assist torque rises earlier than in the related art. Consequently, the steering assist torque for suppressing the abrupt return speed of the steering wheel 1 can be generated at an early point, thereby being capable of returning the steering wheel 1 slowly and appropriately.

In other words, due to the provision of the steering state determination device 21 and the steering assist torque corrector 224, as compared to the related-art steering control devices, the steering state of the driver can be determined in detail, and an offset abrupt change caused by the difference between the steering assist torque-1 and the steering assist torque-2 at the time of switching of the steering assist torque can be suppressed to be a gradual change to suppress a feeling of discomfort. Besides, the steering assist torque for suppressing an abrupt return speed of the steering wheel 1 can be generated at an early point. Consequently, in the steering-wheel return steering from a large steering angle, appropriate steering wheel return characteristics can be realized.

Note that, in the above-mentioned embodiment, the steering angle sensor 4 is used to acquire the steering angle and the steering speed, but the present invention is not limited thereto. It should be understood that a rotation angle of the motor 6 can be used as the steering angle, and a steering angle estimated based on a wheel speed difference may be used. As the steering speed, a steering speed estimated based on a voltage detected by the voltage sensor 10 may also be used.

Further, in the above-mentioned embodiment, the steering assist torque-2 is set to be zero, but the present invention is not limited to this configuration. For example, the steering assist torque-1 calculator 221 in which a predetermined gain to be multiplied by the deviation by the gain corrector 44 of FIG. 4 is smaller than that when the steering assist torque-1 is calculated is used for the calculation of the steering assist torque-2. In other words, with this configuration, the steering assist torque-2 that is not zero but is smaller than the steering assist torque-1 can be acquired, and the control effect can be weakened depending on the result of steering state determination, thereby being capable of suppressing the interference between the steering by the driver and the steering assist torque.

In this case, for example, in FIG. 4, the steering assist torque-2 calculator 222 has the same configuration as that of the steering assist torque-1 calculator 221 except that the gain in the gain corrector 44 is smaller.

The steering assist torque-1, the steering assist torque-2, and a steering assist torque having an intermediate value therebetween may be calculated, and one steering assist torque may be selected therefrom depending on the magnitude of the steering torque. Consequently, a more appropriate steering assist torque can be selected depending on the steering state of the driver, and an appropriate steering assist torque can be acquired.

In this case, as shown in FIG. 2 and FIG. 4, for example, the gain corrector 44 of the steering assist torque-1 calculator 221 is configured to change or switch the gain based on the steering torque acquired from the torque sensor 5.

Note that, in this embodiment, the steering state determination device 21 includes all of the six novel steering state determination sections. However, in a related-art steering control device including a steering state determination device for determining a steering state of a driver based on the magnitude of a steering torque detected by a steering torque detector, at least one of the steering state determination sections may be used.

Note that, the motor 6 and the speed reduction mechanism 7 serve as an actuator, the steering state determination device 21 serves as a steering state determination section, the steering assist torque-1 calculator 221, the steering assist torque-2 calculator 222, and the steering assist torque-3 calculator 223 serve as a steering assist torque calculation section, the steering assist torque corrector 224 serves as a steering assist torque correction section, the current driver 12 serves as an actuator control section, the switches 101 and 104 serve as a switch section, and the differentiators 102 and 103, the low-pass filter 110 (including the subtractor 105, the multiplier 106, the adder 107, and the integrator 108), and the adder 109 serve as a filtering section.

The manually-operating steering determination device 85 serves as a manually-operating steering determination section, the abrupt steering wheel return determination device 86 serves as an abrupt steering wheel return determination section, the high-acceleration steering wheel return determination device 87 serves as a high-acceleration steering wheel return determination section, the manual return steering determination device 88 serves as a manual return steering determination section, the additional-steering determination device 89 serves as an additional-steering determination section, and the abrupt turning-back steering determination device 90 serves as an abrupt turning-back steering determination section.

The steering angle sensor 4 serves as a steering angle detection section, the vehicle speed sensor 8 serves as a vehicle speed detection section, and the torque sensor 5 serves as a steering torque detection section.

The steering assist torque-1 serves as a first steering assist torque, the steering assist torque-2 serves as a second steering assist torque, and the steering assist torque-3 serves as a reference steering assist torque.

The steering torque thresholds 1 to 3 serve as first to third steering torque thresholds, respectively.

The present invention is not intended to be limited to the above-mentioned embodiments, and it should be understood that the present invention includes all possible combinations of the embodiments.

INDUSTRIAL APPLICABILITY

The steering control device and the like according to the present invention are applicable to various kinds of steering devices, and similar effects are obtained.

REFERENCE SIGNS LIST

1 steering wheel, 2 steering shaft, 3 steered wheel, 4 steering angle sensor, 5 torque sensor, 6 motor, 7 speed reduction mechanism, 8 vehicle speed sensor, 9 current sensor, 10 voltage sensor, 11 control unit, 12 current driver, 21 steering state determination device, 22 steering assist torque calculator, 41 target steering speed setter, 42 actual steering speed calculator, 43 subtractor, 44 gain corrector, 61 steering torque threshold-1 setter, 62, 64, 68, 73, 76, 79, 83 magnitude comparator, 63 steering torque threshold-2 setter, 65, 67 selector, 66 previous-value output device (delay device), 69 AND device, 70 steering torque change amount calculator, steering torque change amount threshold setter, 74 steering acceleration calculator, 75 steering acceleration threshold setter, 77 sign comparator, 78 steering-holding determination device, 80 steering shaft reaction torque calculator, 81 change amount calculator, 82 steering shaft reaction torque change amount threshold setter, 84 OR device, 85 manually-operating steering determination device, 86 abrupt steering wheel return determination device, 87 high-acceleration steering wheel return determination device, 88 manual return steering determination device, 89 additional-steering determination device, 90 abrupt turning-back steering determination device, 101, 104 switch, 102, 103 differentiator, 105 subtractor, 106 multiplier, 107 adder, 108 integrator, 109 adder, 110 low-pass filter, 221 steering assist torque-1 calculator, 222 steering assist torque-2 calculator, 223 steering assist torque-3 calculator, 224 steering assist torque corrector

The invention claimed is:

1. A steering control device, comprising:
   an actuator for applying a steering assist torque to a steering system of a vehicle;
   a steering torque detection section for detecting a steering torque acting on the steering system of the vehicle;
   a steering angle detection section for detecting a steering angle of the steering system of the vehicle;
   a steering assist torque calculation section for calculating a steering assist torque to be applied to the actuator in order to improve return characteristics of the steering system;
   a steering state determination section for determining a steering state of a driver;
   a steering assist torque correction section for correcting the steering assist torque depending on a steering state determination result of the steering state determination section; and
   an actuator control section for controlling the actuator depending on the corrected steering assist torque,
   wherein the steering state determination section determines the steering state of the driver based on at least the steering torque, the steering angle, and a vehicle speed, and on a combination of at least two of the following:
      a manually-operating steering determination section for determining a manually-operating steering state of the driver based on a result of comparing a magnitude of the steering torque to magnitudes of a plurality of steering torque thresholds;
      an abrupt steering wheel return determination section for determining an abrupt steering wheel return state based on a result of comparing a magnitude of a change amount of the steering torque to a magnitude of a steering torque change amount threshold;
      a high-acceleration steering wheel return determination section for determining a steering wheel return state involving high acceleration based on a result of comparing a magnitude of a steering acceleration of the steering system to a magnitude of a steering acceleration threshold;
      a manual turning-back steering determination section for determining a manual turning-back steering state of the driver based on a result of comparing a sign indicating a direction of the steering torque to a sign of the steering angle; and
      an additional-steering determination section for determining a steering-holding state of the steering system, storing the steering angle at a time of the determination as a steering-holding determination steering angle, and determining an additional-steering state of the driver based on a result of comparing a magnitude of the steering-holding determination steering angle to a magnitude of the steering angle, and
   wherein the actuator control section drives the actuator depending on the steering assist torque that is corrected by the steering assist torque correction section based on the determination result of the steering state of the driver.

2. The steering control device according to claim 1, wherein the manually-operating steering determination section sets a predetermined first steering torque threshold and a predetermined second steering torque threshold that is equal to or larger than the predetermined first steering torque threshold, sets a third steering torque threshold based on a result of comparing the magnitude of the steering torque to a magnitude of the predetermined first steering torque threshold and a result of comparing the magnitude of the steering torque to a magnitude of the predetermined second steering torque threshold, and determines the steering state based on a result of comparing the magnitude of the steering torque to a magnitude of the third steering torque threshold.

3. The steering control device according to claim 1, wherein the manually-operating steering determination section changes at least one of the plurality of steering torque thresholds depending on the vehicle speed.

4. The steering control device according to claim 2, wherein the manually-operating steering determination section changes at least one of the plurality of steering torque thresholds depending on the vehicle speed.

5. The steering control device according to claim 1, wherein, when the change amount of the steering torque is larger than the steering torque change amount threshold, the abrupt steering wheel return determination section determines that the steering state is the abrupt steering wheel return state, and
wherein the steering assist torque correction section corrects the steering assist torque so that the steering assist torque is increased.

6. The steering control device according to claim 1, wherein, when the steering acceleration is larger than the steering acceleration threshold, the high-acceleration steering wheel return determination section determines that the steering state is the steering wheel return state involving high acceleration, and
wherein the steering assist torque correction section corrects the steering assist torque so that the steering assist torque is increased.

7. The steering control device according to claim 1, wherein, when the sign of the steering torque and the sign of the steering angle are opposite to each other, the manual return steering determination section determines that the steering state is the manual return steering state of the driver,
wherein the steering assist torque correction section corrects the steering assist torque so that the steering assist torque is decreased, and
wherein the actuator control section drives the actuator depending on the steering assist torque corrected by the steering assist torque correction section.

8. The steering control device according to claim 1, wherein, when the steering angle is larger than the steering-holding determination steering angle, the additional-steering determination section determines that the steering state is the additional-steering state of the driver,
wherein the steering assist torque correction section corrects the steering assist torque so that the steering assist torque is decreased, and
wherein the actuator control section drives the actuator depending on the steering assist torque corrected by the steering assist torque correction section.

9. The steering control device according to claim 1, wherein the steering state determination section further comprises an abrupt turning-back steering determination section for determining abrupt turning-back steering,
wherein the abrupt turning-back steering determination section calculates a steering shaft reaction torque, which acts on the steering system of the vehicle, and a steering shaft reaction torque change amount based on a state of the actuator, compares the calculated steering shaft reaction torque change amount to a steering shaft reaction torque change amount threshold, and determines that the abrupt turning-back steering is performed when the steering shaft reaction torque change amount is larger than the steering shaft reaction torque change amount threshold,
wherein the steering assist torque correction section corrects the steering assist torque so that the steering assist torque is decreased, and
wherein the actuator control section drives the actuator depending on the steering assist torque corrected by the steering assist torque correction section.

10. The steering control device according to claim 2, wherein the steering state determination section further comprises an abrupt turning-back steering determination section for determining abrupt turning-back steering,
wherein the abrupt turning-back steering determination section calculates a steering shaft reaction torque, which acts on the steering system of the vehicle, and a steering shaft reaction torque change amount based on a state of the actuator, compares the calculated steering shaft reaction torque change amount to a steering shaft reaction torque change amount threshold, and determines that the abrupt turning-back steering is performed when the steering shaft reaction torque change amount is larger than the steering shaft reaction torque change amount threshold,
wherein the steering assist torque correction section corrects the steering assist torque so that the steering assist torque is decreased, and
wherein the actuator control section drives the actuator depending on the steering assist torque corrected by the steering assist torque correction section.

11. The steering control device according to claim 5, wherein the steering state determination section further comprises an abrupt turning-back steering determination section for determining abrupt turning-back steering,
wherein the abrupt turning-back steering determination section calculates a steering shaft reaction torque, which acts on the steering system of the vehicle, and a steering shaft reaction torque change amount based on a state of the actuator, compares the calculated steering shaft reaction torque change amount to a steering shaft reaction torque change amount threshold, and determines that the abrupt turning-back steering is performed when the steering shaft reaction torque change amount is larger than the steering shaft reaction torque change amount threshold,
wherein the steering assist torque correction section corrects the steering assist torque so that the steering assist torque is decreased, and
wherein the actuator control section drives the actuator depending on the steering assist torque corrected by the steering assist torque correction section.

12. The steering control device according to claim 6, wherein the steering state determination section further comprises an abrupt turning-back steering determination section for determining abrupt turning-back steering,
wherein the abrupt turning-back steering determination section calculates a steering shaft reaction torque, which acts on the steering system of the vehicle, and a steering shaft reaction torque change amount based on a state of the actuator, compares the calculated steering shaft reaction torque change amount to a steering shaft reaction torque change amount threshold, and determines that the abrupt turning-back steering is performed when the steering shaft reaction torque change amount is larger than the steering shaft reaction torque change amount threshold,
wherein the steering assist torque correction section corrects the steering assist torque so that the steering assist torque is decreased, and wherein the actuator control section drives the actuator depending on the steering assist torque corrected by the steering assist torque correction section.

13. The steering control device according to claim 1,
wherein the steering assist torque calculation section calculates at least a first steering assist torque, which is to be applied to the actuator in order to improve return characteristics of the steering system, and a second steering assist torque that is smaller than the first steering assist torque,
wherein the steering assist torque correction section comprises:
  a switch section for selecting and switching, depending on the result of the steering state determination section, one steering assist torque from among at least the first steering assist torque and the second steering assist torque; and
  a filtering section for suppressing an abrupt change in steering assist torque at a time of the switching, which is caused by a difference between both the steering assist torques, and
wherein the filtering section corrects a change amount of filtering, which is a change amount of a filter output, depending on a change amount of the selected steering assist torque.

14. The steering control device according to claim 1,
wherein the steering assist torque calculation section calculates a reference steering assist torque, which is determined based on the steering torque and the vehicle speed, and
wherein the steering assist torque correction section outputs the steering assist torque obtained by correcting the reference steering assist torque with the corrected steering assist torque.

15. A steering control method, comprising the steps of:
calculating a steering assist torque to be applied to an actuator for applying the steering assist torque to a steering system of a vehicle in order to improve return characteristics of the steering system;
determining a steering state of a driver;
correcting the steering assist torque depending on a result of the steering state determination; and
controlling the actuator depending on the corrected steering assist torque,
wherein the step of determining a steering state of a driver comprises determining the steering state of the driver based on at least a steering torque acting on the steering system, a steering angle, and a vehicle speed, and on a combination of at least two of the following:
  a manually-operating steering state determination for determining a manually-operating steering state of the driver based on a result of comparing a magnitude of a steering torque to magnitudes of a plurality of steering torque thresholds;
  an abrupt steering wheel return determination for determining an abrupt steering wheel return state based on a result of comparing a magnitude of a change amount of the steering torque to a magnitude of a steering torque change amount threshold;
  a high-acceleration steering wheel return determination for determining a steering wheel return state involving high acceleration based on a result of comparing a magnitude of a steering acceleration of the steering system to a magnitude of a steering acceleration threshold;
  a manual return steering determination for determining a manual return steering state of the driver based on a result of comparing a sign indicating a direction of the steering torque to a sign of the steering angle; and
  an additional-steering determination for determining a steering-holding state of the steering system, storing the steering angle at a time of the determination as a steering-holding determination steering angle, and determining an additional-steering state of the driver based on a result of comparing a magnitude of the steering-holding determination steering angle to a magnitude of the steering angle, and
wherein the actuator is driven depending on the steering assist torque that is corrected by the step for correcting the steering assist torque based on the determination result of the steering state of the driver.

* * * * *